United States Patent
Mrazek et al.

(10) Patent No.: US 7,796,137 B1
(45) Date of Patent: Sep. 14, 2010

(54) ENHANCED TAG-BASED STRUCTURES, SYSTEMS AND METHODS FOR IMPLEMENTING A POOL OF INDEPENDENT TAGS IN CACHE MEMORIES

(75) Inventors: Dane T. Mrazek, Redwood City, CA (US); Sameer M. Gauria, Mountain View, CA (US); James C. Bowman, Pescadero, CA (US)

(73) Assignee: NVIDIA Corporation, Santa Clara, CA (US)

( * ) Notice: Subject to any disclaimer, the term of this patent is extended or adjusted under 35 U.S.C. 154(b) by 776 days.

(21) Appl. No.: 11/552,415

(22) Filed: Oct. 24, 2006

(51) Int. Cl.
*G09G 5/36* (2006.01)
*G06F 12/08* (2006.01)

(52) U.S. Cl. .......................... 345/557; 711/3
(58) Field of Classification Search ................. 345/557; 711/3
See application file for complete search history.

(56) References Cited

U.S. PATENT DOCUMENTS

| | | | |
|---|---|---|---|
| 6,321,321 B1 * | 11/2001 | Johnson | 711/217 |
| 6,629,206 B1 * | 9/2003 | Johnson | 711/123 |
| 6,674,441 B1 * | 1/2004 | Frank | 345/503 |
| 7,213,109 B1 * | 5/2007 | Bauman et al. | 711/133 |
| 7,475,210 B2 * | 1/2009 | Yamada | 711/168 |

\* cited by examiner

*Primary Examiner*—Ryan R Yang
(74) *Attorney, Agent, or Firm*—Cooley LLP

(57) ABSTRACT

Disclosed are an apparatus, a system, a method, a graphics processing unit ("GPU"), a computer device, and a computer medium to implement a pool of independent enhanced tags to, among other things, decouple a dependency between tags and cachelines. In one embodiment, an enhanced tag-based cache structure includes a tag repository configured to maintain a pool of enhanced tags. Each enhanced tag can have a match portion configured to form an association between the enhanced tag and an incoming address. Also, an enhanced tag can have a data locator portion configured to locate a cacheline in the cache in response to the formation of the association. The data locator portion enables the enhanced tag to locate multiple cachelines. Advantageously, the enhanced tag-based cache structure can be formed to adjust the degree of reusability of the enhanced tags independent from the degree of latency tolerance for the cacheline repository.

18 Claims, 6 Drawing Sheets

ENHANCED TAG-BASED STRUCTURES, SYSTEMS AND METHODS FOR IMPLEMENTING A POOL OF INDEPENDENT TAGS IN CACHE MEMORIES

BRIEF DESCRIPTION OF THE INVENTION

This invention relates generally to computing devices and cache memories, and more particularly, to an apparatus, system and method for implementing enhanced tags to decouple a dependency between tags and cachelines.

BACKGROUND OF THE INVENTION

A cache is a temporary storage facility for storing copies of frequently accessed data that can be accessed faster than from the originating source, such as a system memory. A cache contains a number of entries, with each entry containing cache data (e.g., within a cacheline), and a tag referencing the data in the cacheline. Usually, there is a one-to-one correspondence between the tag and the cacheline for each entry.

FIG. 1 illustrates a conventional cache implementing a group 101 of entries 108, ranging from entry 0 to entry n. Each entry 108 is composed of a tag 102 and a cacheline 104. Entry ("3") 100 depicts the one-to-one correspondence between a tag and cacheline that is common in conventional caching techniques. As shown, tag 112 includes a value of hexadecimal number 9A7E, which references data 114. Further, group 101 includes a number 120 ("N(tags)") of tags 102 that is the same as the number ("N(cachelines)") of cachelines 104. Virtually all normal caches have a tag referencing a corresponding cacheline, regardless of whether a cache uses direct-mapped, set-associative or fully associative look-up methods. While functional, conventional caches comporting with the caching techniques demonstrated in FIG. 1 are not well suited to independently optimize, for example, cache reuse and latency tolerance for the cache.

Cache structures are designed with cache reusability and latency tolerance in mind, both of which are operational characteristics. Cache reuse describes the ability of a cache to reuse tags without fetching data from the originating source. For example, data requests in some applications seem to frequently reuse a certain number of tags (and thus cachelines), such as during looping and branching operations. As such, latency tolerance relates to a number of tags used to provide a history of past data requests (of the cache) that can satisfy new requests without requiring an access to the originating source. Latency tolerance describes the ability of a cache to operate continuously without stalling (i.e., data to return from an originating source after it is requested). The depth of a cache (i.e., the number of cachelines) generally dictates the tolerance of a cache to avoid latency. Presently, cache designers generally tend to optimize both cache reuse and latency tolerance simultaneously in view of the one-to-one correspondence between tags and cachelines. A drawback to this approach is that if cache 100 requires a number of additional cachelines 130, as shown in FIG. 1, to achieve an acceptable level of latency tolerance, then a corresponding number of additional tags 140 (and supporting hardware resources) is also required—regardless of whether fewer tags could satisfactorily support the cache reusability. For example, if a cache designer adds an additional cachelines 130 that include two-hundred (200) cachelines, then the designer typically also implements a corresponding number of additional tags 140 to include two-hundred (200) tags.

In view of the foregoing, it would be desirable to provide an apparatus, a system, a method, a graphics processing unit ("GPU"), a computer device, and a computer medium that minimize the above-mentioned drawbacks, thereby implementing, among other reasons, enhanced tags to decouple a dependency between tags and cachelines.

SUMMARY OF THE INVENTION

Disclosed are an apparatus, a system, a method, a graphics processing unit ("GPU"), a computer device, and a computer medium to implement a pool of independent enhanced tags to, among other things, decouple a dependency between tags and cachelines. In one embodiment, an enhanced tag-based cache structure includes a tag repository configured to maintain a pool of enhanced tags for a cache. Each enhanced tag can have a match portion configured to form an association between the enhanced tag and an incoming address. In addition, an enhanced tag can have a data locator portion configured to locate a cacheline in the cache in response to the formation of the association. The data locator portion enables the enhanced tag to locate multiple cachelines. Advantageously, the enhanced tag-based cache structure can be formed to adjust the degree of reusability of the enhanced tags independent from the degree of latency tolerance for the cacheline repository.

Further, the enhanced tag-based cache structure can further include a cacheline repository for maintaining cachelines. At least a subset of the cachelines is accessible by the enhanced tag. In one embodiment, the quantity of enhanced tags in the pool of enhanced tags is less than the quantity of the cachelines in the cache repository. Advantageously, the tag repository can consume fewer resources than if the quantity of enhanced tags in the pool of enhanced tags is equivalent to the quantity of the cachelines in the cache repository. In a specific embodiment, the enhanced tag-based cache structure further includes a cacheline access controller configured to assign a pooled enhanced tag from the pool of enhanced tags to a cacheline of the cachelines. The cacheline access controller can include a tag selector for selecting a tag from the pool of enhanced tags, and a cacheline identifier linker configured to form a link between the cacheline and the tag. It can also include a cacheline usage monitor configured to determine that the cacheline is available to store data. As such, the enhanced tag-based cache structure further includes a cacheline usage determination means to determine the availability of the cachelines to store data, according to an embodiment. In at least one embodiment, the match portion includes a representation for an address in external memory and the data locator portion includes a cacheline identifier. The enhanced tag-based cache structure and a number of comparators can constitute an apparatus, according to an embodiment. The comparators operate to compare the representation for the address against the pool of enhanced tags to generate the association as a match, thereby signifying a cache hit. Advantageously, the pool of enhanced tags requires fewer comparators to determine the match than if the quantity of enhanced tags in the pool is the same as the quantity of the cachelines. In one embodiment, the cache only caches memory reads.

In various embodiments, a method provides for the access of data in a cache in a graphics processing unit ("GPU") using enhanced tags. The method can include determining that an enhanced tag is relevant to an incoming address, converting the enhanced tag into a cacheline identifier associated with a cacheline containing data, and accessing the data. In alternate embodiments, a processor with a graphics pipeline produces computer-generated images. The processor includes a frame buffer memory configured to maintain vertex attribute data for vertices, and an enhanced tag-based cache memory. The enhanced tag-based cache memory stores a portion of the vertex attribute data and it provides an amount of latency tolerance independent from an amount of tag reusability.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
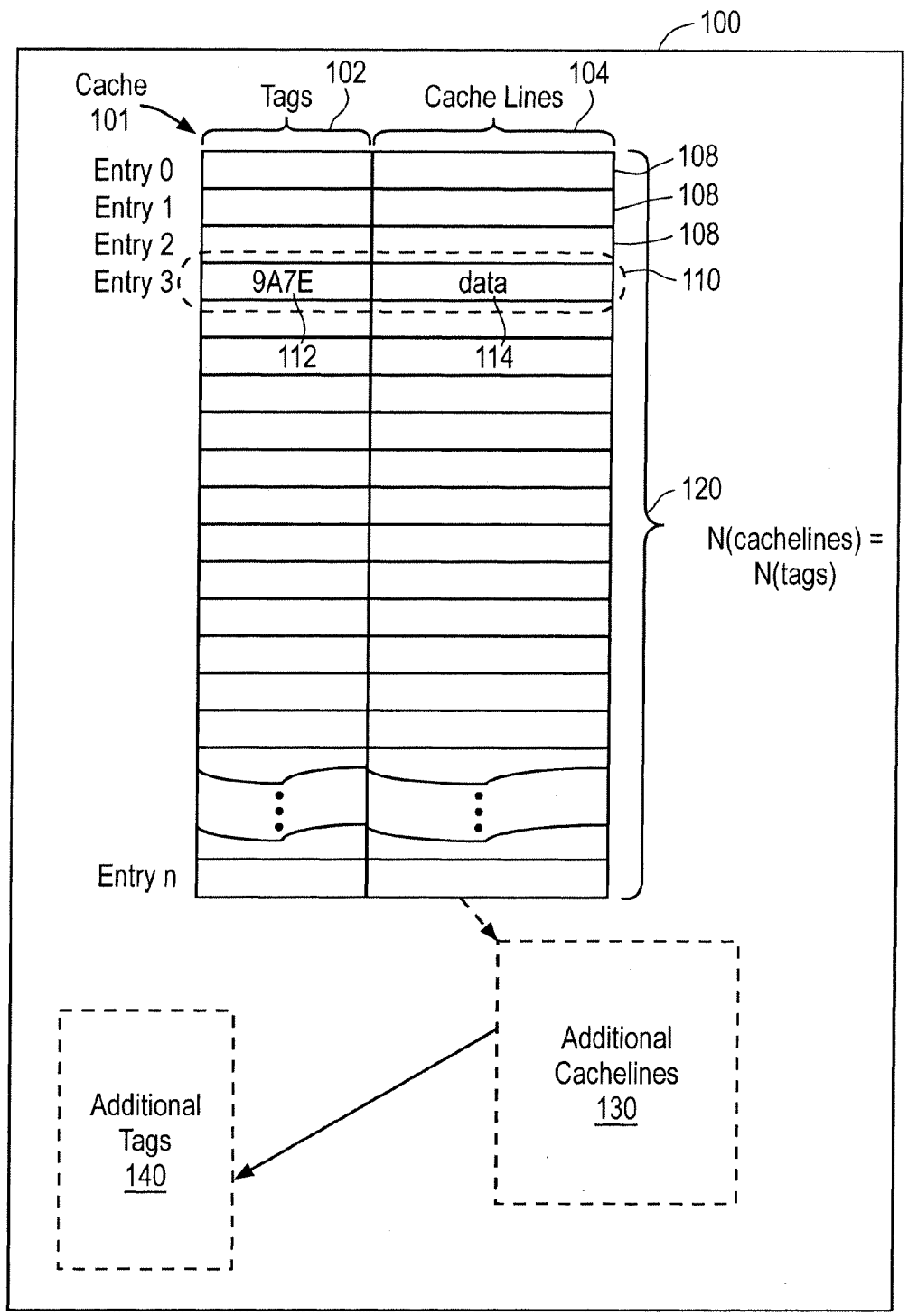
FIG. 1 illustrates a conventional cache having a group of entries, each composed of tag and a corresponding cacheline.
Figure 2:
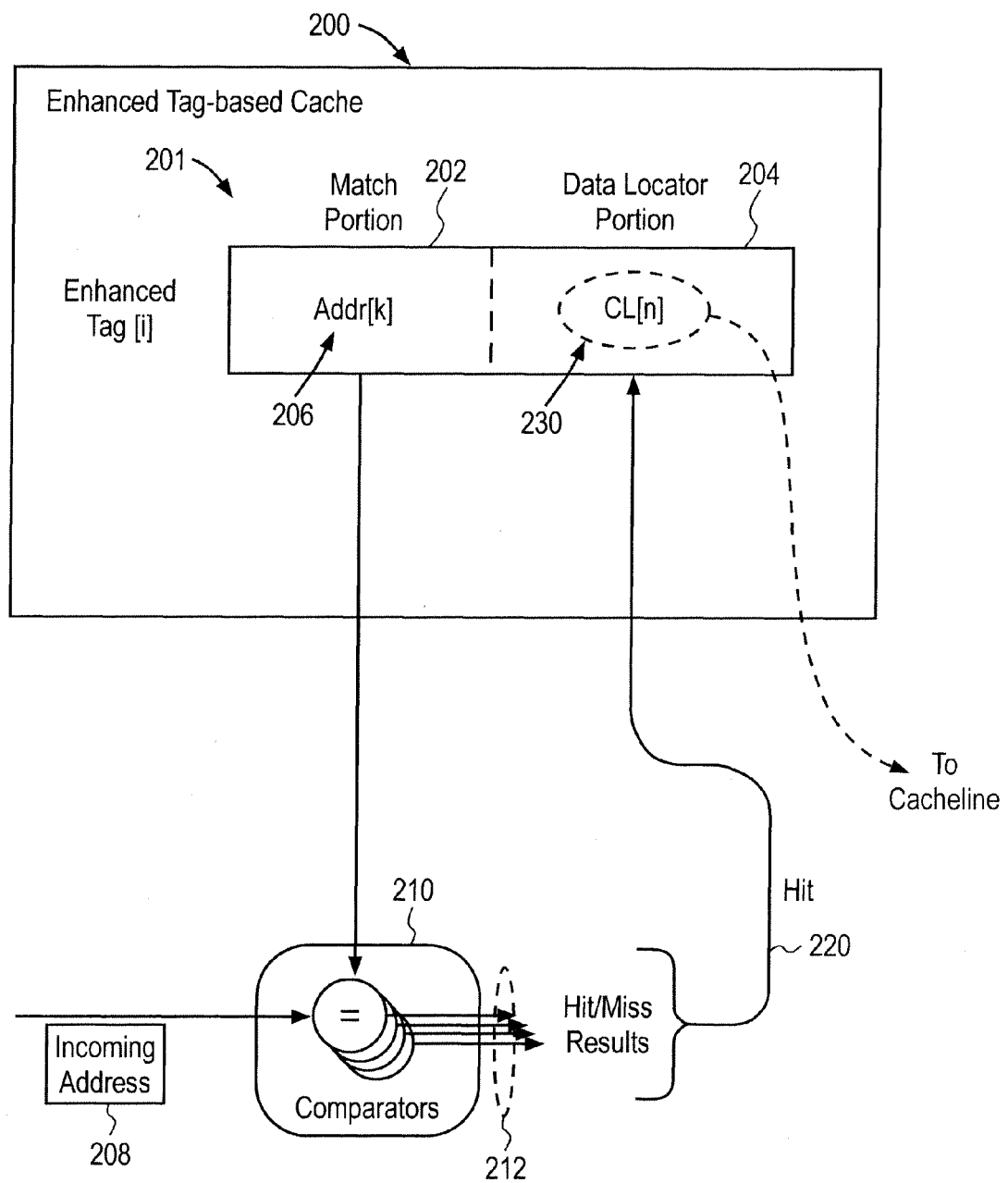
FIG. 2 is a block diagram of an apparatus for implementing enhanced tags to decouple a dependency between tags and cachelines, according to at least one specific embodiment of the invention.

FIG. 2 is a block diagram of an apparatus for implementing enhanced tags to decouple a dependency between tags and cachelines, according to at least one specific embodiment of the invention. In the example shown, an enhanced tag-based cache 200 is configured to implement an enhanced tag [i] 201 to access a cacheline of a cache (not shown) for either writing or reading data. Enhanced tag [i] 201 includes a match portion 202 and a data locator portion 204. Match portion is configured to form an association between enhanced tag [i] 201 and an incoming address 208. In one embodiment, the association is a relationship between enhanced tag [i] 201 and an incoming address that signifies that both are the same, for example, after a comparison operation determines that they both match. Data locator portion 204 is configured to locate the cacheline in response to the formation of the association (i.e., in response to the match). The data locator portion enables enhanced tag [i] 201 to locate multiple cachelines rather than just one cacheline. In at least one embodiment, match portion 202 includes a representation for an address ("Addr[k]") 206 in memory (e.g., a source memory) and data locator portion 204 includes a cacheline identifier ("CL[n]") 230.

In operation, one or more comparators 210 compare an incoming address 208 (or portions thereof) to the representation for address 206 from match portion 202. In addition, comparators 210 can compare other representations (not shown) for other addresses 206 in other enhanced tag [i] 201 against incoming address 208. If comparators 210 generate hit/miss results 212 that include a cache hit 220, then enhanced tag-based cache 200 uses data locator portion 204 to identify and access a cacheline associated with cacheline identifier 230. Otherwise, hit/miss results 212 that include a cache miss can cause enhanced tag-based cache 200 to retrieve the missing cacheline data from the originating memory source for temporary storage in an available cacheline.

Advantageously, enhanced tag-based cache 200 can adjust the degree of reusability of a pool of enhanced tags [i] 201 in a manner that is independent from the degree of latency tolerance for the cache. For example, enhanced tag-based cache 200 can include a tag repository and a cacheline repository. The tag repository maintains a number of enhanced tags [i] 201 to optimize tag reusability, and the cacheline repository includes a number of cachelines. In various embodiments, enhanced tag-based cache 200 decouples a dependency between the number of enhanced tags [i] 201 and the number of cachelines. Advantageously, the tag repository can consume fewer resources than if the quantity of enhanced tags in the pool of enhanced tags is equivalent to the quantity of the cachelines in the cache repository. As such, a tag repository for maintaining a pool of enhanced tags [i] 201 can have fewer circuit elements (e.g., registers) as there are few tags for linking to cachelines. Further, enhanced tag-based cache 200 can operate with fewer comparators as there are fewer tags with which to compare against an incoming address.

Figure 3:
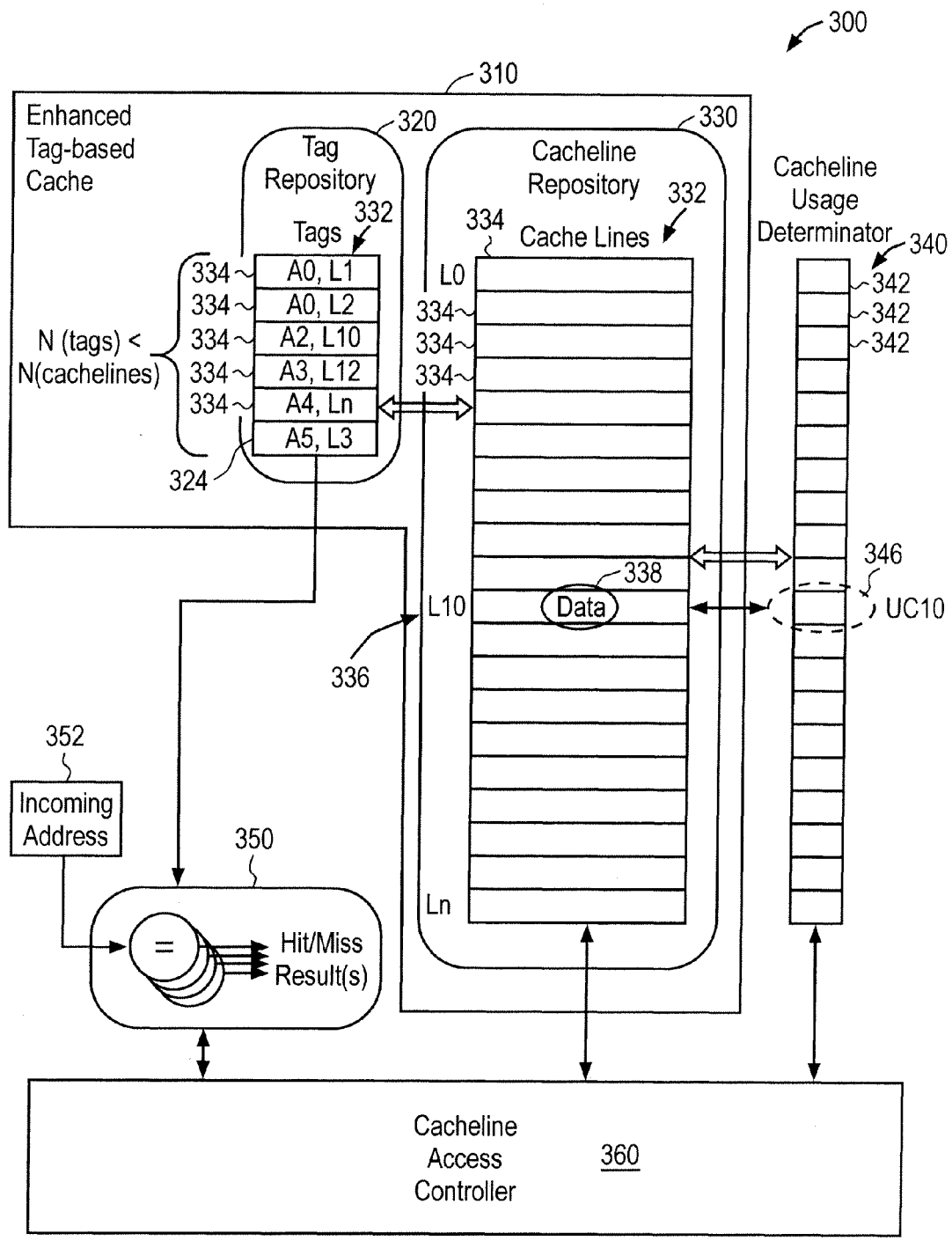
FIG. 3 is a block diagram of an enhanced tag-based cache, according to at least one specific embodiment of the invention.

FIG. 3 is a block diagram of an apparatus including an enhanced tag-based cache, according to at least one specific embodiment of the invention. In the example shown, apparatus 300 includes an enhanced tag-based cache 310, a cacheline usage determinator 340, comparators 350 and a cacheline access controller 360. Enhanced tag-based cache 310 includes a tag repository 320 for maintaining a pool 322 of enhanced tags 324, as well as cacheline repository 330 for maintaining a group 332 of cachelines 334. As such, enhanced tag-based cache 310 facilitates separate repositories for tags and cachelines, or, in the least, provides for the decoupling of one-to-one correspondences between tags and cachelines. Note that in this example, the number of enhanced tags 324, or N(tags), is less than the number of cachelines, or N(cachelines). Thus, a cache designer can select N(tags) to optimize cache reuse for a specific application, and can use N(cachelines) to optimize latency tolerance for the same application. In some embodiments, the value of N(tags) enables tag repository 320 to consume fewer resources (e.g., circuit elements) than if the quantity of enhanced tags 324 in pool 322 is equivalent to the quantity of cachelines 334, which is N(cachelines).

Apparatus 300 also includes a cacheline usage determinator 340 to track the usage of cachelines 334. In one embodiment, cacheline usage determinator 340 is a set of usage counters 342. Each usage counter 342 maintains a value representative of the usage of a corresponding cacheline. For example, usage counter ("UC10") 346 maintains a count reflecting the usage of cacheline 336 and its data 338. In one embodiment, each usage counter 342 is incremented when a corresponding cacheline 334 is used (e.g., when a data request is first sent, when there are subsequent hits to the cacheline, etc). A usage counter 342 is decremented when the data from the cacheline is consumed, or a data request for that data is otherwise resolved. Positive values stored in the usage counters indicate that respective cachelines are in use and thus are unavailable.

In operation, comparators 350 compare an incoming address 352 to each tag in pool 320 of enhanced tags. Specifically, comparators 350 compare incoming address 352 to match portions of enhanced tags 324, which in this example, include addresses A0, A1, A2, A3, A4 and A5 as representations. Further, consider that comparators 350 generate a cache hit with the contents of enhanced tag 326. Cacheline access controller 360, upon detecting the cache hit, determines that the match portion of enhanced tag 326 includes address "A2" (or portion thereof). Then, cacheline access controller 360 uses the data locator portion of enhanced tag 326 to determine which cacheline to access. Here, the data locator portion ("L10") of enhanced tag 326 refers to cacheline ("L10") 336. In at least one embodiment, cacheline access controller 360 fetches data 338 from cacheline 336 and provides it to the source requesting data 338.

Note that the decoupling of tags from cachelines thus enables each enhanced tag to reference or map to any of cachelines 334. For example, enhanced tag 326 can reference cacheline 336 at some point in time, but then can reference any other cacheline 334 a some other point in time. As such, enhanced tags 324 can reference multiple cachelines. In some embodiments, apparatus 300 constitutes a cache, such as a cache that only caches memory reads. In various embodiments, enhanced tag-based cache 310 can constitute a cache with more or fewer elements shown in FIG. 3. Further the elements shown in FIG. 3 can be combined and/or separated into subelements, as well as can be distributed throughout, for example, a computing device. Note also that should comparators 350 fail to generate a cache hit (i.e., a cache miss), then cacheline access controller 360 can be configured to assign one of enhanced tags 324 as a pooled enhanced tag to any one of cachelines 334 (e.g., when a particular cacheline is available).

Figure 4:
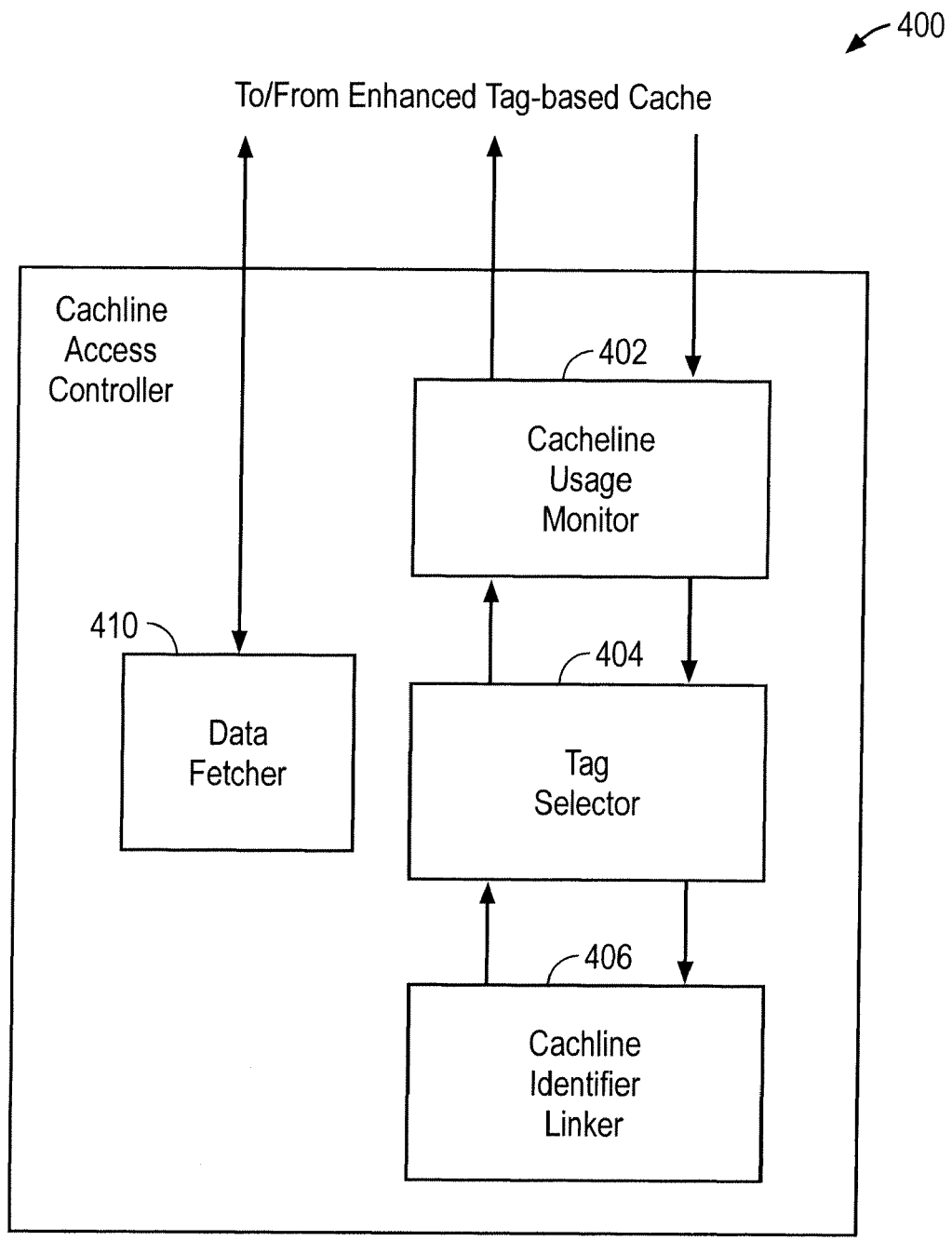
FIG. 4 is a block diagram of an example of a cacheline access controller, according to a specific embodiment of the invention.

FIG. 4 is a block diagram of an example of a cacheline access controller, according to a specific embodiment of the invention. In the example shown, cacheline access controller 400 includes a data fetcher 410, a cacheline usage monitor 402, a tag selector 404 and a cacheline identifier linker 406. Data fetcher 410 operates, at least in part, to coordinate the access of a cacheline by, for example, converting an enhanced tag into a cacheline identifier, which is associated with a cacheline containing the data sought. Upon determining that an incoming address matches one of the enhanced tags (i.e., there is a cache hit), data fetcher 410 acquires the data locator portion of the enhanced tag and uses it to identify the relevant cacheline. But if there is a cache miss, cacheline access controller 400 generally uses cacheline usage monitor 402, a tag selector 404 and a cacheline identifier linker 406 to store data in an available cacheline (or to initialize the pool of enhanced tags).

Cacheline usage monitor 402 is communicatively coupled to a cacheline usage determinator, such as a usage counter, to determine the usage of each cacheline. Cacheline usage monitor 402 evaluates the various usages and then classifies a subset of cachelines as available cachelines. As such, cacheline usage monitor 492 determines whether a cacheline is available to store data. For example, cacheline usage monitor 402 classifies any cacheline associated with, for example, a zero value in its usage counter as an available cacheline. Cacheline access controller 400 thus can use the available cachelines to store copies of data that is not currently stored in the tag associated cachelines.

Once cacheline access controller 400 identifies available cachelines, tag selector 404 operates to select one of the enhanced tags to resynchronize its linkage to an available cacheline. In one embodiment, tag selector 404 traces the last time since last cache hit for each enhanced tag and selects the least recently used ("LRU") enhanced tag (i.e., the oldest tag without a cache hit). More generally, however, a tag replacement policy is an implementation detail and the present invention may be practiced using other types of tag replacement policies, such as a Least Recently Allocated (LRA) tag replacement policy. Once tag selector 404 selects an enhanced tag, cacheline identifier linker 406 forms a link between the available cacheline and the selected tag (i.e., the selected pooled enhanced tag). In one embodiment, cacheline identifier linker 406 inserts a cacheline identifier into the data locator portion of the selected tag, thereby establishing another cacheline to which the updated enhanced tag refers. In some embodiments, cacheline identifiers are stored in a separate repository (e.g., a data locator repository) from the other addresses stored in the match portions of the enhanced tags. It will be understood that a LRU tag replacement policy is only one example.

Figure 5:
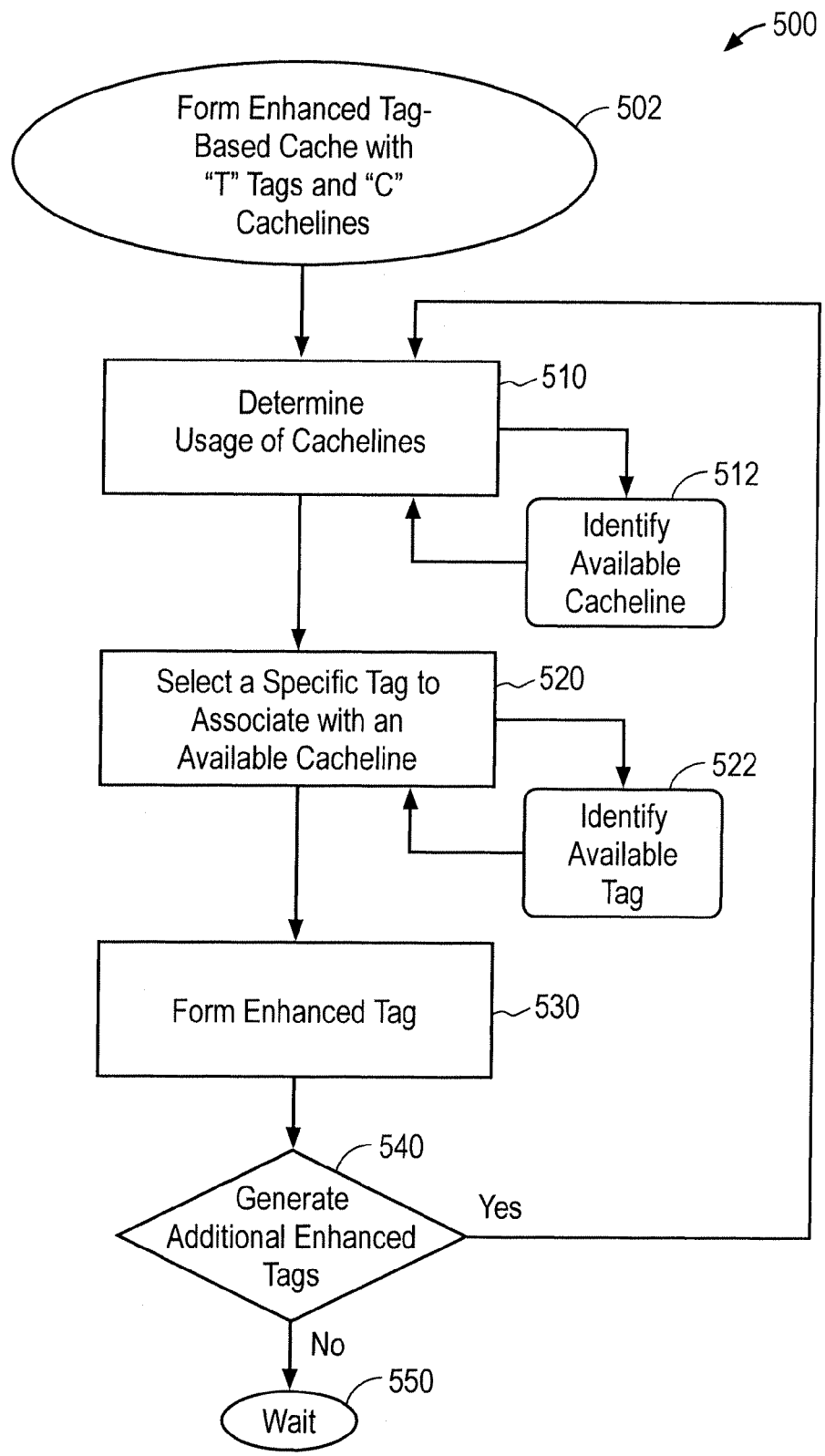
FIG. 5 depicts one example of a flow for generating an enhanced tag, according to at least one specific embodiment of the invention.

FIG. 5 depicts one example of a flow for generating an enhanced tag, according to at least one specific embodiment of the invention. Flow 500 begins with the establishment or formation of an enhanced tag-based cache having a number of enhanced tags, T, and a number of cachelines, C 502, where values of T and C optimize cache reuse and latency tolerance, respectively. Generally, values of T are less than the values of C. A cacheline access controller determines usage of cachelines at 510. The cacheline access controller classifies one or more cachelines having little or negligible usage as available cachelines, and at 512, identifies at least one available cacheline. The cacheline access controller then selects a specific tag at 520. It does so by identifying an available tag at 522. The selected enhanced tag is linked to the available cacheline, thereby, forming an enhanced tag at 530. The cacheline access controller generates other additional enhanced tags at 540 in response, for example, to cache misses. But if a current pool of enhanced tags is sufficiently providing data to a source of data requests (e.g., without cache misses), then the cacheline access controller can halt the generation of enhanced tags at 550.

Figure 6:
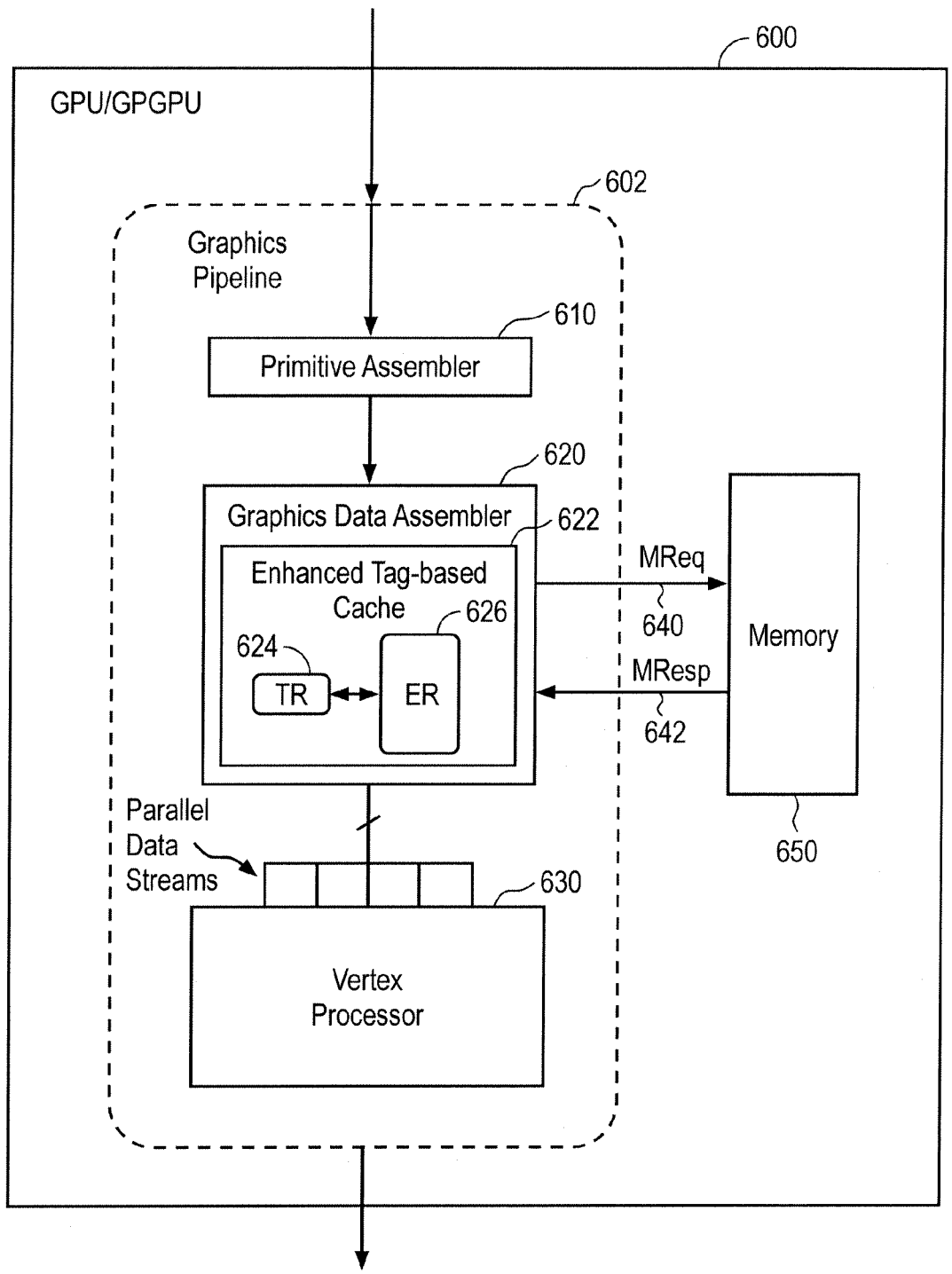
FIG. 6 illustrates an example of a graphics processing unit ("GPU") implementing an enhanced tag-based cache in accordance with an embodiment of the invention.

FIG. 6 illustrates an example of a graphics processing unit ("GPU") implementing an enhanced tag-based cache 622 in accordance with an embodiment of the invention. In this example, GPU 600, which can be a general purpose GPU ("GPGPU"), includes a graphics pipeline 602 for rendering images through various graphics operations, such as geometric transformations, clipping, lighting, scaling and the like. Graphics pipeline 602 includes a primitive assembler 610 for assembling primitives. In addition, graphics pipeline 602 can include a graphics data assembler 620 for fetching—at least in part—vertex attributes from a memory 650, which can be a frame buffer. Further, graphics pipeline 602 can include a vertex processor (or shader) 630 to perform parallel processing by a number of parallel processors that process each type of attribute. Each of the parallel processes is associated with one of the parallel data streams produced by graphics data assembler 620.

Graphics data assembler 620 includes an enhanced tag-based cache 622 for temporarily storing vertex attributes. In one embodiment, enhanced tag-based cache 622 can include—in whole or in part—a tag repository ("TR") 624 for maintaining enhanced tags and a cacheline repository ("CR") 626 for maintaining data in cachelines. In operation, graphics data assembler 620 compares requests for addresses containing vertex information against a pool of enhanced tags in tag repository 624. The addresses relate to the memory locations for memory 650. If there is a cache hit, vertex information is fetched from one or more cachelines in cache repository 626. Otherwise, if there is a cache miss, then a memory request ("MReq") 640 is directed to memory 650 to fetch data as a memory response ("MResp") 642. Advantageously, the size (i.e., the number of cachelines) of cache repository 626 can be set to avoid stalls, thereby establishing a degree of latency tolerance between memory requests 640 for data and the return of data in memory responses 642. For example, if it takes X number of clocks to ensure that there is a continual flow minimal or no stalls) from memory 650, then cache repository 626 likely should contain X number of cachelines. Further, the number of tags stored in tag repository 624 can be less than X. In various embodiments, tag repository 624 maintains 5 to 80 enhanced tags, while cache repository 626 maintains 150 to 400 cachelines. In a specific implementation, tag repository 624 maintains 40 enhanced tags and cache repository 626 maintains 256 cachelines.

An embodiment of the present invention relates to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention can be implemented using Java, C++, or other object-oriented programming language and development tools. Another embodiment of the invention can be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments.

Although the above descriptions of the various embodiments relate to a cache in graphics pipelines, the discussion is applicable to any type of cache other than found in a GPU.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. An apparatus for implementing a pool of independent tags to access data in a cache, said apparatus comprising:
    an enhanced tag-based cache structure comprising:
        a tag repository configured to maintain a pool of enhanced tags, each enhanced tag including:
            a match portion configured to form an association between said enhanced tag and an incoming address, and
            a data locator portion configured to locate a cacheline in said cache in response to the formation of said association,
        wherein said data locator portion enables said enhanced tag to locate any individual cacheline within a set of multiple cachelines in said cache.

2. The apparatus of claim 1 wherein said enhanced tag-based cache structure further comprises a cacheline repository for maintaining cachelines, at least a subset of said cachelines being accessible by said enhanced tag.

3. The apparatus of claim 2 wherein said enhanced tag-based cache structure is formed to adjust the degree of reusability of said enhanced tags independent from the degree of latency tolerance for said cacheline repository.

4. The apparatus of claim 2 wherein the quantity of enhanced tags in said pool of enhanced tags is less than the quantity of said cachelines in said cache repository.

5. The apparatus of claim 4 wherein said tag repository consumes fewer resources than if said quantity of enhanced tags in said pool of enhanced tags is equivalent to said quantity of said cachelines in said cache repository.

6. The apparatus of claim 2 wherein said enhanced tag-based cache structure further comprises a cacheline access controller configured to assign a pooled enhanced tag from said pool of enhanced tags to a cacheline of said cachelines.

7. The apparatus of claim 6 wherein said cacheline access controller comprises:
    a tag selector configured to select a tag from said pool of enhanced tags; and
    a cacheline identifier linker configured to form a link between said cacheline and said tag.

8. The apparatus of claim 7 wherein said cacheline access controller further comprises a cacheline usage monitor configured to determine that said cacheline is available to store data.

9. The apparatus of claim 6 wherein said enhanced tag-based cache structure further comprises a cacheline usage determination means to determine the availability of said cachelines to store data.

10. The apparatus of claim 1 wherein said match portion includes a representation for an address in external memory and said data locator portion includes a cacheline identifier.

11. The apparatus of claim 10 further comprising comparators configured to compare said representation for said address against said pool of enhanced tags to generate said association as a match, thereby signifying a cache hit.

12. The apparatus of claim 11 wherein said pool of enhanced tags requires fewer comparators to determine said match than if the quantity of enhanced tags in said pool is the same as the quantity of said cachelines.

13. The apparatus of claim 1 wherein said cache that stores data related only to memory read requests.

14. A method to access data in a cache in a graphics processing unit ("GPU"), said method comprising:
    determining that an enhanced tag is relevant to an incoming address;
    converting said enhanced tag into a cacheline identifier associated with a cacheline containing data; and
    accessing said data;
    wherein a data locator portion of said enhanced enables said enhanced a to locate any individual cacheline within a set of multiple cachelines in said cache.

15. The method of claim 14 further comprising:
    determining that data associated with said incoming address is not contained within said cache;
    selecting another enhanced tag; and
    linking an available cacheline to said another enhanced tag.

16. A processor with a graphics pipeline to produce computer-generated images, said processor comprising:
- a frame buffer memory configured to maintain vertex attribute data for vertices; and
- an enhanced tag-based cache memory configured to store a portion of said vertex attribute data and to disassociate latency tolerance and tag reuse wherein said enhanced tag-based cache memory includes:
- a number of cachelines for storing said portion of vertex attribute data; and
- a tag repository for maintaining a number of enhanced tags, wherein said number of enhanced tags differs from said number of cachelines;

wherein each tag includes data locator portion that enables said enhanced tag to locate any individual cacheline within a set of multiple cachelines in said cache.

17. The processor of claim 16 wherein said latency tolerance is a function of the number of cachelines and said tag reuse is a function of the number of enhanced tags.

18. The processor of claim 16 further comprising a graphics processing unit ("GPU") including said graphics pipeline, wherein said tag repository maintains a pool of enhanced tags wherein the number of enhanced tags is about one-fourth of said number of cachelines.

* * * * *